US012561722B2

(12) United States Patent
Saad

(10) Patent No.: US 12,561,722 B2
(45) Date of Patent: Feb. 24, 2026

(54) UTILIZING TREND SETTER BEHAVIOR TO PREDICT ITEM DEMAND AND DISTRIBUTE RELATED DIGITAL CONTENT ACROSS DIGITAL PLATFORMS

(71) Applicant: Adobe Inc., San Jose, CA (US)

(72) Inventor: Michele Saad, Austin, TX (US)

(73) Assignee: Adobe Inc., San Jose, CA (US)

( * ) Notice: Subject to any disclaimer, the term of this patent is extended or adjusted under 35 U.S.C. 154(b) by 397 days.

(21) Appl. No.: 17/934,485

(22) Filed: Sep. 22, 2022

(65) Prior Publication Data

US 2024/0104619 A1 Mar. 28, 2024

(51) Int. Cl.
*G06Q 30/00* (2023.01)
*G06Q 30/0601* (2023.01)

(52) U.S. Cl.
CPC ..... *G06Q 30/0605* (2013.01); *G06Q 30/0603* (2013.01)

(58) Field of Classification Search
CPC ........................ G06Q 30/0605; G06Q 30/0603
See application file for complete search history.

(56) References Cited

U.S. PATENT DOCUMENTS 10,049,308 B1 8/2018 Dhua et al.
2011/0320715 A1* 12/2011 Ickman ................... G06Q 30/02
711/E12.017

2013/0290339 A1* 10/2013 LuVogt ................... G06Q 50/01
707/E17.089
2018/0302682 A1* 10/2018 Saxena .............. H04N 21/4722

OTHER PUBLICATIONS

A. Gogulamudi and S. Prabhu, "Consumer Decisions Under the Influence of social media & Behavioral Targeting," 2022 International Conference on Decision Aid Sciences and Applications (DASA), Chiangrai, Thailand, 2022, pp. 357-361. (Year: 2022).*

* cited by examiner

*Primary Examiner* — Anand Loharikar
(74) *Attorney, Agent, or Firm* — Keller Preece PLLC

(57) ABSTRACT

The present disclosure relates to systems, methods, and non-transitory computer-readable media that distribute item-based digital content across digital platforms using trend setting participants of those digital platforms. For instance, in one or more embodiments, the disclosed systems generate affinity metrics for digital items from a catalog of digital items with respect to a plurality of trend setting participants of a plurality of digital platforms using attributes of digital posts by the plurality of trend setting participants on the plurality of digital platforms and corresponding attributes of the digital items. The disclosed systems further determine predicted demand metrics for the digital items on the plurality of digital platforms using the affinity metrics. Using the predicted demand metrics, the disclosed systems distribute digital content related to the digital items for display on a plurality of client devices via the plurality of digital platforms.

20 Claims, 9 Drawing Sheets

800

Generating Affinity Metrics For Digital Items With Respect To Trend Setting Participants Of Digital Platforms *802*

Determining Predicted Demand Metrics Using The Affinity Metrics *804*

Distributing Digital Content For The Digital Items Using The Predicted Demand Metrics *806*

912

Computing Device
900

Processor
902

Memory
904

Storage
906

I/O Interface
908

Communication Interface
910

UTILIZING TREND SETTER BEHAVIOR TO PREDICT ITEM DEMAND AND DISTRIBUTE RELATED DIGITAL CONTENT ACROSS DIGITAL PLATFORMS

BACKGROUND

Recent years have seen significant advancement in hardware and software platforms for distributing digital content for display on computing devices. For instance, many existing systems distribute digital content to target computing device users that may be particularly interested in the digital content. Some of these systems distribute digital content for display via digital platforms, such as social media platforms, to leverage information that indicates the interests and activities of computing device users that participate on such platforms.

SUMMARY

One or more embodiments described herein provide benefits and/or solve one or more problems in the art with systems, methods, and non-transitory computer-readable media that efficiently distribute item-based digital content across digital platforms by flexibly using an anticipated demand determined using trend-setting participants of the platforms. To illustrate, in one or more embodiments, a system identifies participants of digital platforms that exhibit trend setting behavior. The system further leverages information related to these trend setting participants to anticipate the demand for catalog items on those digital platforms. Based on the anticipated demand, the system distributes digital content related to those catalog items across the digital platforms. For instance, in some cases, the system distributes digital content for a particular catalog item to a digital platform upon determining that a trend setting participant has featured the catalog item or a similar item on the digital platform. In this manner, the system flexibly anticipates demand using early data signals from trend setting behavior to efficiently optimize the distribution of catalog item digital content across relevant platforms.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
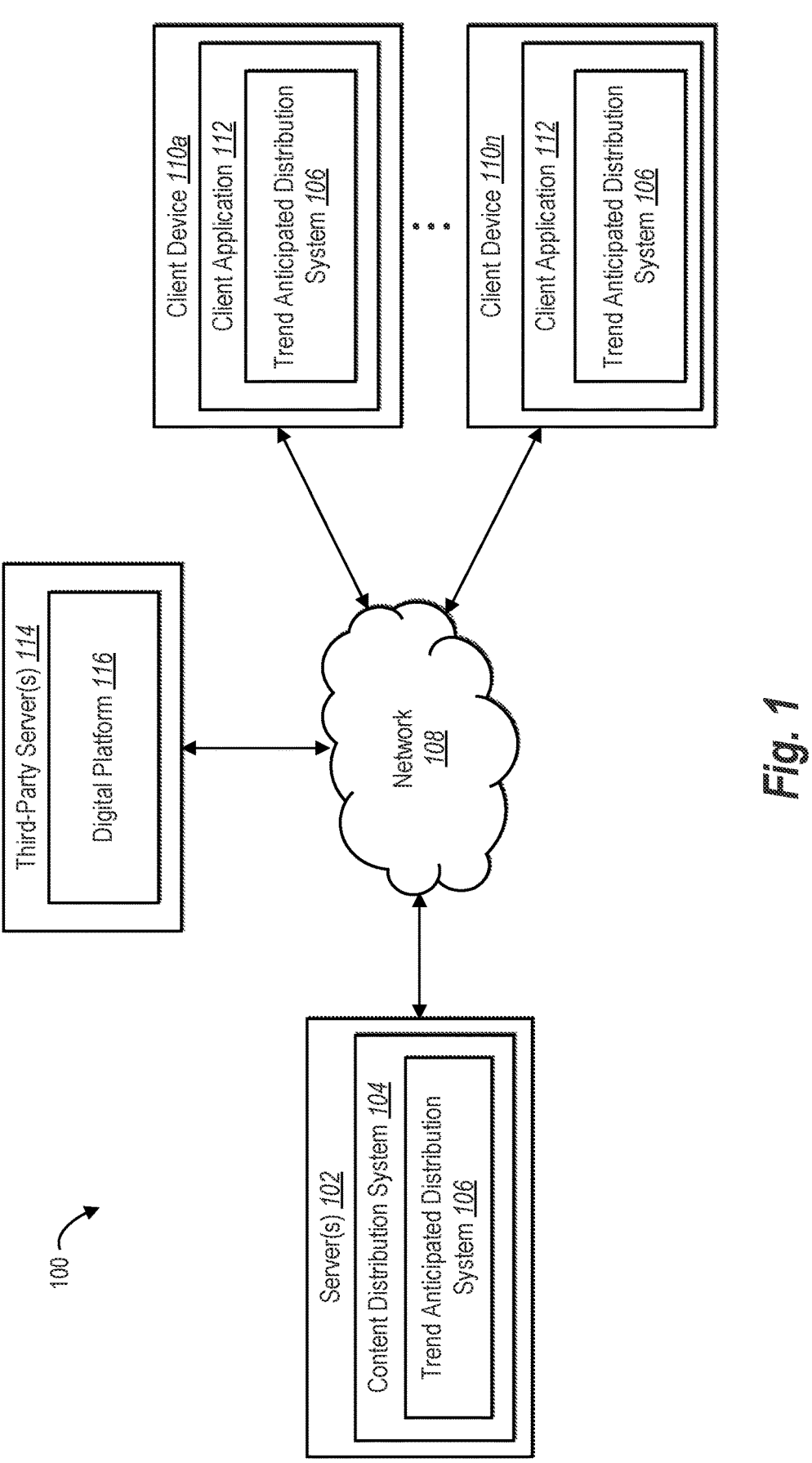
FIG. 1 illustrates an example environment in which a trend anticipated distribution system operates in accordance with one or more embodiments.

One or more embodiments described herein include a trend anticipated distribution system that provides digital content for display via digital platforms based on anticipated trends of corresponding items. For example, in one or more embodiments, for a given digital platform, the trend anticipated distribution system identifies one or more trend setting participants. The trend anticipated distribution system utilizes the activities of the trend setting participant(s) to anticipate which items from a catalog will trend on that digital platform. The trend anticipated distribution system further distributes, to the digital platform, digital content related to the item(s) that are anticipated to trend. Accordingly, in some embodiments, the trend anticipated distribution system considers trend setting participants and their corresponding activities on a plurality of digital platforms to optimally distribute digital content for catalog items to those digital platforms upon which the catalog items are anticipated to begin trending.

To provide an example, in one or more embodiments, the trend anticipated distribution system generates affinity metrics for digital items from a catalog of digital items with respect to a plurality of trend setting participants of a plurality of digital platforms using attributes of digital posts by the plurality of trend setting participants on the plurality of digital platforms and corresponding attributes of the digital items. The trend anticipated distribution system further determines predicted demand metrics for the digital items on the plurality of digital platforms using the affinity metrics. Using the predicted demand metrics, the trend anticipated distribution system distributes digital content related to the digital items for display on a plurality of client devices via the plurality of digital platforms.

As just mentioned, in one or more embodiments, the trend anticipated distribution system utilizes trend setting participants of a plurality of digital platforms to distribute digital content related to digital items from a catalog across those digital platforms. Indeed, in some embodiments, the trend anticipated distribution system identifies which participants of the digital platforms are trend setting participants. For instance, in some cases, the trend anticipated distribution system determines whether a participant of a digital platform is a trend setting participant by determining a trend setting score for the participant based on activities (e.g., digital posts) of the participant and activities of other participants on the digital platform. In some instances, the trend anticipated distribution system utilizes the trend setting score to determine whether the participant engages in activities that subsequently become trends on the digital platform.

As further mentioned, in one or more embodiments, the trend anticipated distribution system determines affinities between the trend setting participants and the digital items from the catalog. In particular, in some embodiments, the trend anticipated distribution system determines affinity metrics that indicate relationships between the digital items and the trend setting participants. To illustrate, in some implementations, the trend anticipated distribution system determines an affinity metric for a digital item with respect to a trend setting participant using one or more attributes of the digital item and one or more attributes of digital posts of the trend setting participant. In some cases, the trend anticipated distribution system determines an affinity metric for each digital item from the catalog with respect to each identified trend setting participant.

Additionally, as mentioned, in one or more embodiments, the trend anticipated distribution system determines predicted demand metrics for the digital items on the digital platforms using the affinity metrics. For example, in some embodiments, the trend anticipated distribution system utilizes the affinity metrics determined for a digital item with respect to the trend setting participants of a digital platform to predict whether a demand for that digital item will arise on that digital platform. Thus, the trend anticipated distribution system utilizes the affinities between trend setting participants and digital items to anticipate which digital items will trend on which digital platforms.

In one or more embodiments, the trend anticipated distribution system distributes digital content related to the digital items for display via the digital platforms based on the predicted demand metrics. For example, in some cases, the trend anticipated distribution system allocates resources for a given digital item to those digital platforms anticipated to have a need for the digital item as indicated by its predicted demand metrics. Thus, the trend anticipated distribution system provides a distribution of catalog items (via their corresponding digital content) across digital platforms to meet anticipated demand.

The trend anticipated distribution system provides advantages over conventional systems. For example, conventional content distribution systems suffer from technological shortcomings that result in inflexible and inefficient operation. To illustrate, conventional systems are typically rigid in that they distribute digital content for digital items after a trend has been detected (e.g., after the trend has already begun). For instance, many conventional systems learn trends from data in an online fashion and react by distributing digital content to meet those trends. Such systems, however, often react too late, distributing the digital content after the trend for an item has peaked or ended. Some conventional systems attempt to distribute the digital content before a trend has become a "mass trend," but these systems still miss out on opportunities for exposing the featured digital items as they fail to flexibly anticipate the trends before they occur.

Additionally, conventional content distribution systems often fail to operate efficiently. Indeed, by distributing digital content after a trend has begun—missing exposure opportunities for digital items afforded by the earlier stages of the trend—conventional systems distribute their digital content inefficiently. In particular, upon finding that the distribution of digital content for an item did not provide a satisfactory exposure of the item, such systems must often redistribute the digital content. As these systems chase trends rather than anticipate trends, they may fall into a cycle of iteratively redistributing digital content and consuming the necessary computing resources (e.g., processing power, memory, or bandwidth) in order to get the desired level of exposure for their digital items. Further, certain computational and other costs are associated with populating a digital platform with digital content. Thus, by iteratively distributing the same digital content across various platforms, conventional systems are populating multiple digital platforms with the same digital content, multiplying these costs.

The anticipated trend distribution system operates with improved flexibility when compared to conventional systems. In particular, the anticipated trend distribution system flexibly anticipates trends for digital items and distributes digital content in accordance with the anticipated trends. Indeed, by looking at the affinities between digital items and trend setting participants of digital items, the anticipated trend distribution system flexibly anticipates which digital items will trend on which digital platforms and distributes the digital content accordingly.

Further, the anticipated trend distribution system operates with improved efficiency when compared to conventional systems. In particular, by distributing digital content based on anticipated trends, the anticipated trend distribution system better captures the exposure opportunities for digital items afforded by the entirety of a trend. Thus, the anticipated trend distribution system avoids the iterative redistribution and populating of digital content across digital platforms experienced by many conventional systems, reducing the amount of computing resources utilized to obtain a desired level of exposure for a digital item.

As illustrated by the foregoing discussion, the present disclosure utilizes a variety of terms to describe features and benefits of the trend anticipated distribution system. Additional detail is now provided regarding the meaning of these terms. For example, as used herein, the term "digital platform" refers to a collection of software-based features. In particular, in some embodiments, a digital platform refers to a software-based platform that is utilized or interacted with by users, computing devices, and/or other software-based systems. For instance, in some cases, a digital platform includes a website or software-based application. In some instances, a digital platform includes a software platform supported by and/or accessed through a website and/or a software-based application. For example, in some implementations, a digital platform includes a social media application or online marketplace.

Additionally, as used herein, the term "participant" refers to a participant of one or more digital platforms. In particular, in some embodiments, a participant refers to a user that engages with one or more digital platforms (e.g., via one or more computing devices). In some implementations, a participant of a digital platform is associated with a profile that is created and/or managed via the digital platform. Accordingly, in some cases, a participant is associated with information stored as part of the profile or is otherwise associated with information related to activities of the user on the digital platform.

Further, as used herein, the term "trend setting participant" refers to a participant of a digital platform that exhibits trend setting behavior. In particular, in some embodiments, a trend setting participant refers to a participant whose activities facilitate the beginning of a trend (e.g., where other participants subsequently perform the same or related activities). In some instances, the trend anticipated distribution system determines that a participant is a trend setting participant with respect to a particular digital platform. To illustrate, in some cases, a participant is involved with multiple digital platforms but only exhibits trend setting behavior on one particular digital platform. Accordingly, in some embodiments, the trend anticipated distribution system determines that the participant is a trend setting participant with respect to the one digital platform and a standard (e.g., non-trend setting) participant with respect to the other digital platforms.

Relatedly, as used herein, the term "trend setting score" refers to a score that indicates whether the behavior of a participant is trend setting behavior. In particular, in some embodiments, a trend setting score refers to a numerical value that indicates the trend-setting nature of a participant's behavior. In some cases, a trend setting score quantifies the trend-setting nature of a participant's behavior with respect to a particular digital platform. Indeed, in some instances, the trend anticipated distribution system determines a trend setting score for a participant with respect to a particular digital platform based on the activities of the participant on that digital platform.

As used herein, the term "digital post" refers to a submission of content from a participant to a digital platform. In particular, in some embodiments, a digital post refers to a submission of content from one participant of a digital platform that is to be viewed or otherwise accessed by one or more other participants of the digital platform. To illustrate, a digital post includes, but is not limited to, a comment, a rating, a status, a digital image, a digital video, or a reaction to another digital post.

Additionally, as used herein, the term "digital item" refers to an item that is accessible via a digital platform. In particular, in some embodiments, a digital item refers to an item that is able to be viewed, interacted with, or exchanged on a digital platform. In some cases, a digital item includes a digital product, such as a digital object (e.g., digital image or video) or a digital service (e.g., access to an online software package). In some implementations, a digital item includes a digital representation of a physical product or service. For instance, in some cases, a digital item includes an image or other representation of a physical item or service that can be purchased. Relatedly, as used herein, the term "catalog of digital items" (or "catalog") refers to a set of digital items.

Further, as used herein the term "behavioral metric" refers to a metric corresponding to activity of a participant on a digital platform. In particular, in some embodiments, a behavioral metric refers to qualitative or quantitative measure of digital posts or other activity by a participant on a digital platform. For instance, in some cases, a behavioral metric includes, but is not limited to a measure of the frequency of posting by the participant, a length of digital posts by the participant, or a level of engagement with digital posts of the participant by one or more other participants of the digital platform (e.g., number of views, clicks, comments, and/or reactions).

As used herein, the term "affinity metric" refers to a metric that indicates a level of correspondence between a digital item and a participant of a digital platform, such as a trend setting participant. In particular, in some embodiments, an affinity metric refers to a qualitative or quantitative measure of a relationship between the digital item and the participant. For instance, in some cases, an affinity metric includes a numerical value that scores the relationship between the digital item and the participant Additionally, as used herein, the term "predicted demand metric" refers to a metric that indicates a predicted level of demand for a digital item on a digital platform. In particular, in some embodiments, a predicted demand metric refers to a qualitative or quantitative measure of a predicted demand for a particular digital item on a particular digital platform. Indeed, in some cases, a predicted demand metric provides an indication of whether a digital item is anticipated to begin trending on a digital platform. In some instances, a predicted demand metric further provides an indication of a predicted level of an anticipated trend (e.g., whether an anticipated trend is predicted to be a large trend or a small trend).

As used herein, the term "measure of visual similarity" refers to a metric that indicates a level of visual similarity between a digital post and a digital item. In particular, in some embodiments, a measure of visual similarity refers to a qualitative or quantitative measure of a similarity in appearance between a digital post and a digital item. For instance, in some implementations, a measure of visual similarity indicates a level at which one or more visual attributes of the digital post are similar to one or more corresponding attributes of the digital item.

Additional detail regarding the trend anticipated distribution system will now be provided with reference to the figures. For example, FIG. 1 illustrates a schematic diagram of an exemplary system 100 in which a trend anticipated distribution system 106 operates. As illustrated in FIG. 1, the system 100 includes a server(s) 102, a network 108, client devices 110a-110n, and a third-party server(s) 114.

Although the system 100 of FIG. 1 is depicted as having a particular number of components, the system 100 is capable of having any number of additional or alternative components (e.g., any number of servers, client devices, third-party servers, or other components in communication with the trend anticipated distribution system 106 via the network 108). Similarly, although FIG. 1 illustrates a particular arrangement of the server(s) 102, the network 108, the client devices 110a-110n, and the third-party server(s) 114, various additional arrangements are possible.

The server(s) 102, the network 108, the client devices 110a-110n, and the third-party server(s) 114 are communicatively coupled with each other either directly or indirectly (e.g., through the network 108 discussed in greater detail below in relation to FIG. 9). Moreover, the server(s) 102, the client devices 110a-110n, and the third-party server(s) 114 include one or more of a variety of computing devices (including one or more computing devices as discussed in greater detail with relation to FIG. 9).

As mentioned above, the system 100 includes the server(s) 102. In one or more embodiments, the server(s) 102 generates, stores, receives, and/or transmits data including digital data related to participant activity on one or more digital platforms and digital content related to digital items. In one or more embodiments, the server(s) 102 comprises a data server. In some implementations, the server(s) 102 comprises a communication server or a web-hosting server.

In one or more embodiments, the content distribution system 104 manages the distribution of digital content to client devices (e.g., the client devices 110a-110n). For example, in some instances, the content distribution system 104 distributes digital content related to digital items from a catalog of digital items. In some implementations, the content distribution system 104 distributes digital content for display via one or more digital platforms (e.g., the digital platform 116 hosted on the third-party server(s) 114) that are accessed by the client devices.

In one or more embodiments, the third-party server(s) 114 interacts with the trend anticipated distribution system 106, via the server(s) 102, over the network 108. For example, in some implementations, the third-party server(s) 114 hosts the digital platform 116 (e.g., a social network or digital marketplace) that receives digital content to display from the trend anticipated distribution system 106 based on anticipated trends. Further, in some cases, the third-party server(s)

114 interacts with the client devices 110a-110n and provides data regarding the interactions to the trend anticipated distribution system 106 for anticipating trends.

In one or more embodiments, the client devices 110a-110n include computing devices that access digital platforms and/or display digital content. For example, the client devices 110a-110n include smartphones, tablets, desktop computers, laptop computers, head-mounted-display devices, or other electronic devices. The client devices 110a-110n include one or more applications (e.g., the client application 112) that access digital platforms and/or display digital content. For example, in one or more embodiments, the client application 112 includes a software application installed on the client devices 110a-110n. Additionally, or alternatively, the client application 112 includes a web browser or other application that accesses a software application hosted on the server(s) 102 (and supported by the content distribution system 104).

To provide an example implementation, in some embodiments, the trend anticipated distribution system 106 on the server(s) 102 supports the trend anticipated distribution system 106 on the client device 110n. For instance, in some cases, the trend anticipated distribution system 106 on the server(s) 102 identifies digital items that are anticipated to trend. The trend anticipated distribution system 106 then, via the server(s) 102, communicates the anticipated trends to the client device 110n. The trend anticipated distribution system 106 on the client device 110n submits a request for digital content related to the digital items that are anticipated to trend for display via a digital platform. In some cases, the trend anticipated distribution system 106 on the client device 110n further receives and displays the requested digital content.

In alternative implementations, the trend anticipated distribution system 106 includes a web hosting application that allows the client device 110n to interact with content and services hosted on the server(s) 102. To illustrate, in one or more implementations, the client device 110n accesses a software application supported by the server(s) 102 (e.g., via the digital platform 116 hosted on the third-party server(s) 114). In response, the trend anticipated distribution system 106 on the server(s) 102 anticipates trends for digital items from a catalog of digital items. The server(s) 102 then provides digital content related to the digital items that are anticipated to trend for display on the client device 110n (e.g., via the digital platform 116).

Indeed, the trend anticipated distribution system 106 is able to be implemented in whole, or in part, by the individual elements of the system 100. Indeed, although FIG. 1 illustrates the trend anticipated distribution system 106 implemented with regard to the server(s) 102, different components of the trend anticipated distribution system 106 are able to be implemented by a variety of devices within the system 100. For example, in some cases, one or more (or all) components of the trend anticipated distribution system 106 are implemented by a different computing device (e.g., one of the client devices 110a-110n) or a separate server from the server(s) 102 hosting the content distribution system 104 (e.g., the third-party server(s) 114). Indeed, as shown in FIG. 1, the client devices 110a-110n include the trend anticipated distribution system 106. Example components of the trend anticipated distribution system 106 will be described below with regard to FIG. 7.

Figure 2:
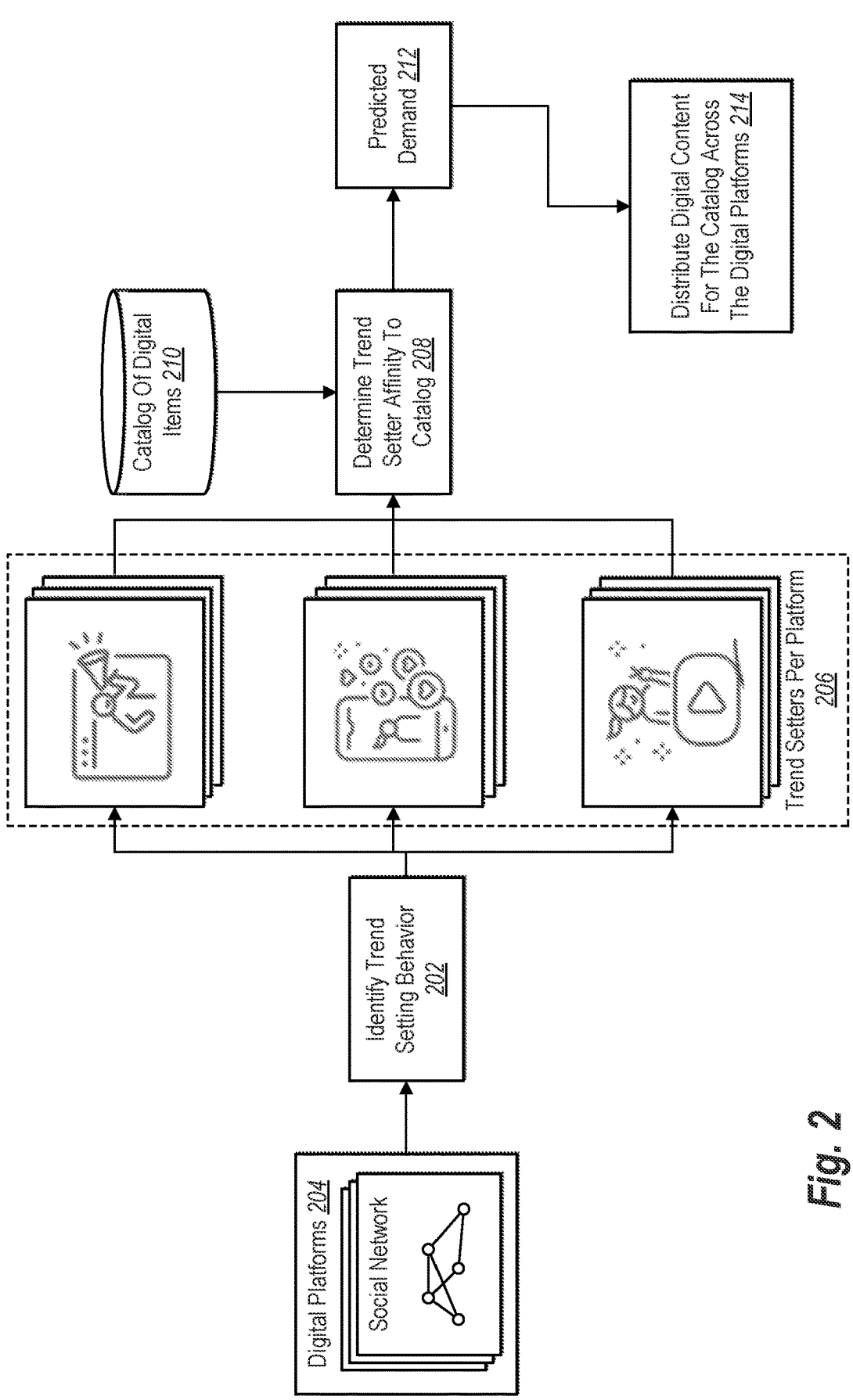
FIG. 2 illustrates an overview diagram of the trend anticipated distribution system distributing digital content related to digital content that is anticipated to being trending in accordance with one or more embodiments.

As previously mentioned, in one or more embodiments, the trend anticipated distribution system 106 distributes digital content related to digital items from a catalog that are anticipated to begin trending. In particular, the trend anticipated distribution system 106 distributes the digital content for display via the digital platforms on which the digital items are anticipated to being trending. FIG. 2 illustrates an overview diagram of the trend anticipated distribution system 106 distributing digital content related to digital content that is anticipated to being trending in accordance with one or more embodiments.

As shown in FIG. 2, the trend anticipated distribution system 106 performs an act 202 of identifying trend setting behavior. In particular, the trend anticipated distribution system 106 identifies trend setting behavior on a plurality of digital platforms 204. In some embodiments, the digital platforms 204 include various types of digital platforms. For instance, as indicated by FIG. 2, the digital platforms 204 include one or more social networks. In some instances, the digital platforms 204 additionally or alternatively include one or more other types of digital platforms, such as one or more digital marketplaces.

In one or more embodiments, the trend anticipated distribution system 106 identifies the trend setting behavior in relation to participants of the digital platforms 204. For instance, as will be discussed in more detail below, the trend anticipated distribution system 106 monitors the activity of the participants on the digital platforms 204, such as digital posts provided by the participants to the digital platforms in some cases. Further, the trend anticipated distribution system 106 determines trend setting scores for the participants based on the monitored activity and identifies the trend setting behavior using the trend setting scores.

As further shown in FIG. 2, the trend anticipated distribution system 106 identifies trend setting participants 206 of the digital platforms 204. In particular, the trend anticipated distribution system 106 determines which participants of the digital platforms 204 are trend setting participants. Indeed, as indicated by FIG. 2, the trend anticipated distribution system 106 identifies the trend setting participants 206 utilizing the identified trend setting behavior determined for the participants of the digital platforms 204 (e.g., using the determined trend setting scores).

As more particularly indicated by FIG. 2, the trend anticipated distribution system 106 identifies one or more trend setting participants for each digital platform from the digital platforms 204. In one or more embodiments, the trend setting participants identified for each digital platform is different than the trend setting participants identified for the other digital platforms. For instance, in some cases, the trend anticipated distribution system 106 determines that a participant exhibits trend setting behavior on a first digital platform but is associated with low activity or inactivity (e.g., does not have an account) on a second digital platform. Accordingly, the trend anticipated distribution system 106 determines that the participant is a trend setting participant of the first digital platform but not the second digital platform.

As further shown in FIG. 2, the trend anticipated distribution system 106 performs an act 208 of determining affinities between the trend setting participants and a catalog of digital items 210. In particular, as will be discussed more below, the trend anticipated distribution system 106 determines an affinity for each digital item from the catalog of digital items 210 with respect to each trend setting participant. For instance, in one or more embodiments, the trend anticipated distribution system 106 generates an affinity metric for each digital item with respect to each trend setting participant that has been identified.

Additionally, as shown in FIG. 2, the trend anticipated distribution system 106 utilizes the affinities between the trend setting participants and the catalog of digital items 210 (e.g., the generated affinity metrics) to determine a predicted demand 212 for the catalog of digital items 210. In particular, the trend anticipated distribution system 106 determines a predicted demand for each digital item from the catalog of digital items 210. For instance, in some cases, the trend anticipated distribution system 106 determines a predicted demand for each digital item on each digital platform from the digital platforms 204. In one or more embodiments, the trend anticipated distribution system 106 generates a predicted demand metric for each digital item.

In one or more embodiments, by determining a predicted demand for the digital items, the trend anticipated distribution system 106 predicts which digital items will trend on which digital platforms. For instance, where a digital item is predicted to have a high demand on a particular digital platform, the trend anticipated distribution system 106 determines that the digital item will trend on that platform. Similarly, where a digital item is predicted to have a low demand on a particular digital platform, the trend anticipated distribution system 106 determines that the digital item is not likely to trend on that digital platform (though it may trend on another digital platform).

As shown in FIG. 2, the trend anticipated distribution system 106 also performs an act 214 of distributing digital content for the catalog of digital items 210 across the digital platforms. In particular, the trend anticipated distribution system 106 utilizes the predicted demand 212 to distribute the digital content. For instance, in some cases, upon determining that a digital item is predicted to have a high demand on a particular digital platform, the trend anticipated distribution system 106 distributes digital content related to that digital item for display via the digital platform. Accordingly, the trend anticipated distribution system 106 anticipates which digital items will trend on which digital platforms and provides digital content that will provide exposure opportunities for those digital items on the digital platforms on which they will trend.

By distributing digital content for digital items across digital platforms using a predicted demand for those digital items, the trend anticipated distribution system 106 operates with improved flexibility and efficiency when compared to conventional systems. Indeed, where many conventional systems provide content after a trend for a digital item has already begun, the trend anticipated distribution system 106 flexibly anticipates trends and distributes the digital content accordingly. By distributing digital content in accordance with anticipated trends, the trend anticipated distribution system 106 efficiently provides digital content for display on the digital platforms before the trend begins, avoiding the iterative distribution of the content that is seen under many conventional systems to obtain the desired level of exposure for certain items.

Figure 3:
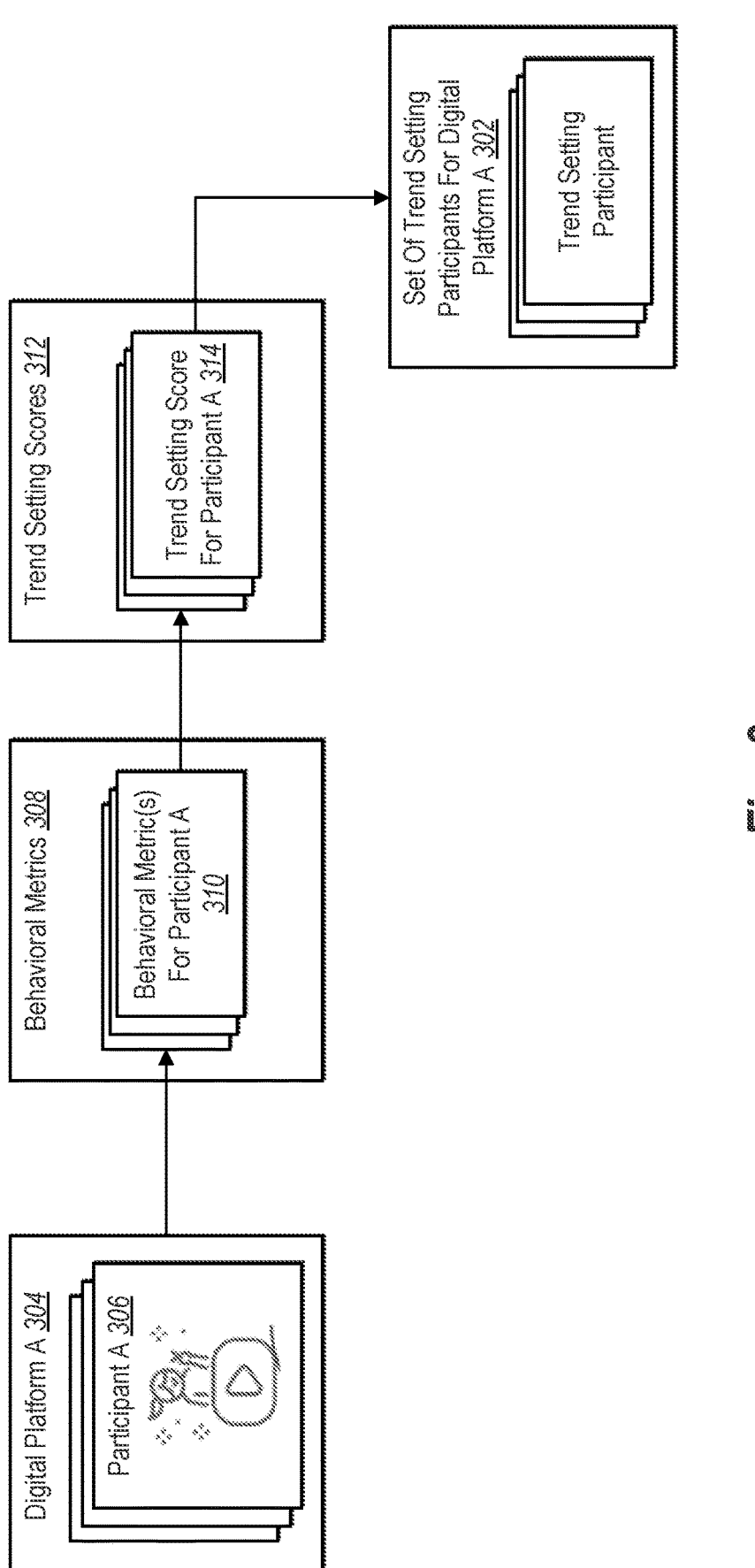
FIG. 3 illustrates a diagram for identifying trend setting participants of a digital platform in accordance with one or more embodiments.

As mentioned, in one or more embodiments, the trend anticipated distribution system 106 identifies trend setting participants of digital platforms. FIG. 3 illustrates a diagram for identifying trend setting participants of a digital platform in accordance with one or more embodiments.

In particular, as shown in FIG. 3, the trend anticipated distribution system 106 determines a set of trend setting participants 302 for a digital platform 304 (referred to as "Digital Platform A"). Indeed, as shown in FIG. 3, the digital platform 304 has a plurality of participants, such as the participant 306 (referred to as "Participant A"). Accordingly, the trend anticipated distribution system 106 determines which of the participants are trend setting participants of the digital platform 304.

Additionally, as shown in FIG. 3, the trend anticipated distribution system 106 determines the set of trend setting participants by receiving or determining behavioral metrics 308 for the participants of the digital platform 304. In particular, the trend anticipated distribution system 106 receives or determines one or more behavioral metrics for each participant of the digital platform 304, such as the behavioral metric(s) 310 for the participant 306. In some embodiments, the behavioral metrics of a participant correspond to the activities of the participant on the digital platform, such as digital posts provided by the participant to the digital platform. In some implementations, the behavioral metrics of a participant additionally or alternatively correspond to the activities of one or more additional participants on the digital platform. In some cases, however, the behavioral metrics correspond to activities of the participant (and other participants) outside the digital platform (e.g., on another digital platform).

To illustrate, in one or more embodiments, a behavioral metric for a participant corresponds to the frequency with which the participant purchases an item or features an item on a digital post that gains popularity at a later stage (e.g., after a lagging period). In other words, the behavioral metric corresponds to the frequency with which the participant purchases an item or features an item (or similar item) on a digital post that is later purchased or featured by one or more additional participants. In some instances, a behavioral metric for the participant corresponds to the number of other participants that exhibit similar behavior after a lagging period (e.g., purchases or features the item or similar in a post).

Additionally, in one or more embodiments, a behavioral metric for a participant corresponds to enrichment data. For instance, in some embodiments, the behavioral metric corresponds to social media connections of the participant on the digital platform (e.g., the identities of other participants to which the participant is connected or the number of other participants to which the participant is connected). As another example, in some cases, the behavioral metric corresponds to the level or type of activity of the participant on the digital platform (e.g., the frequency of posting or the types of digital posts submitted—such as whether the participant typically posts photos or videos or mainly posts on the digital platform by commenting on the posts of other participants).

Further, in one or more embodiments, the behavioral metric for a participant corresponds to the trend setting scores of other participants that exhibit similar behavior to the participant on the digital platform.

As shown in FIG. 3, the trend anticipated distribution system 106 utilizes the behavioral metrics 308 of the participants to determine trend setting scores 312 for the participants. In particular, the trend anticipated distribution system 106 determines a trend setting score for each participant, such as the trend setting score 314 for the participant 306. In some cases, as noted above, the trend anticipated distribution system 106 determines a trend setting score for a participant using the trend setting scores of other participants. Indeed, in some implementations, the trend anticipated distribution system 106 utilizes a recursive approach in determining the trend setting scores 312. In one or more embodiments, the trend anticipated distribution system 106 determines the trend setting scores 312 as described in U.S. Pat. No. 11,170,432 filed on Mar. 31, 2020, entitled RECOMMENDER SYSTEM BASED ON TRENDSETTER INFERENCE, which is incorporated herein by reference in its entirety.

Further, as shown, the trend anticipated distribution system 106 determines the set of trend setting participants 302 for the digital platform 304 utilizing the trend setting scores 312. In particular, the trend anticipated distribution system 106 determines whether a particular participant of the digital platform 304 is a trend setting participant based on the trend setting score of that participant. For instance, in some cases, the trend anticipated distribution system 106 establishes a trend setter threshold and determines whether a participant is a trend setting participant by comparing the corresponding trend setting score to the trend setter threshold.

Thus, in one or more embodiments, the trend anticipated distribution system 106 utilizes the trend setting scores 312 to identify repeating patterns of (i) participants that exhibit distinct associations with particular items (e.g., the purchase of those items or the featuring of those items within digital posts) and (ii) after a lagging period, increased patterns of similar behaviors from other participants. In some cases, the trend anticipated distribution system 106 determines the scores 312 based on the recurrence of these steps in a cycle. Accordingly, in some implementations, the trend anticipated distribution system 106 determines the trend setting score for a participant as a function of how often that participant exhibits unique patterns of activity on the digital platform that are followed by a mass of similar activity after a lagging period as well as the size of the mass (e.g., the number of other participants) that exhibits the similar activity after the lag period.

In one or more embodiments, the trend anticipated distribution system 106 utilizes a temporal outlier detection algorithm and/or a pattern matching algorithm—such as one or more of those algorithms described in U.S. Pat. No. 11,170,432—to identify the leading patterns of behavior of a participant that are then followed by mass similar behavior after the lagging period.

In one or more embodiments, the trend anticipated distribution system 106 similarly determines a set of trend setting participants for one or more additional digital platforms. Indeed, as previously noted, the trend anticipated distribution system 106 monitors the participants of a plurality of digital platforms in some instances. Accordingly, for each digital platform, the trend anticipated distribution system 106 identifies at least one trend setting participant. In some cases, for a particular participant, the trend anticipated distribution system 106 determines a separate trend setting score for each digital platform based on the activity of that participant on the respective digital platform.

Figure 4:
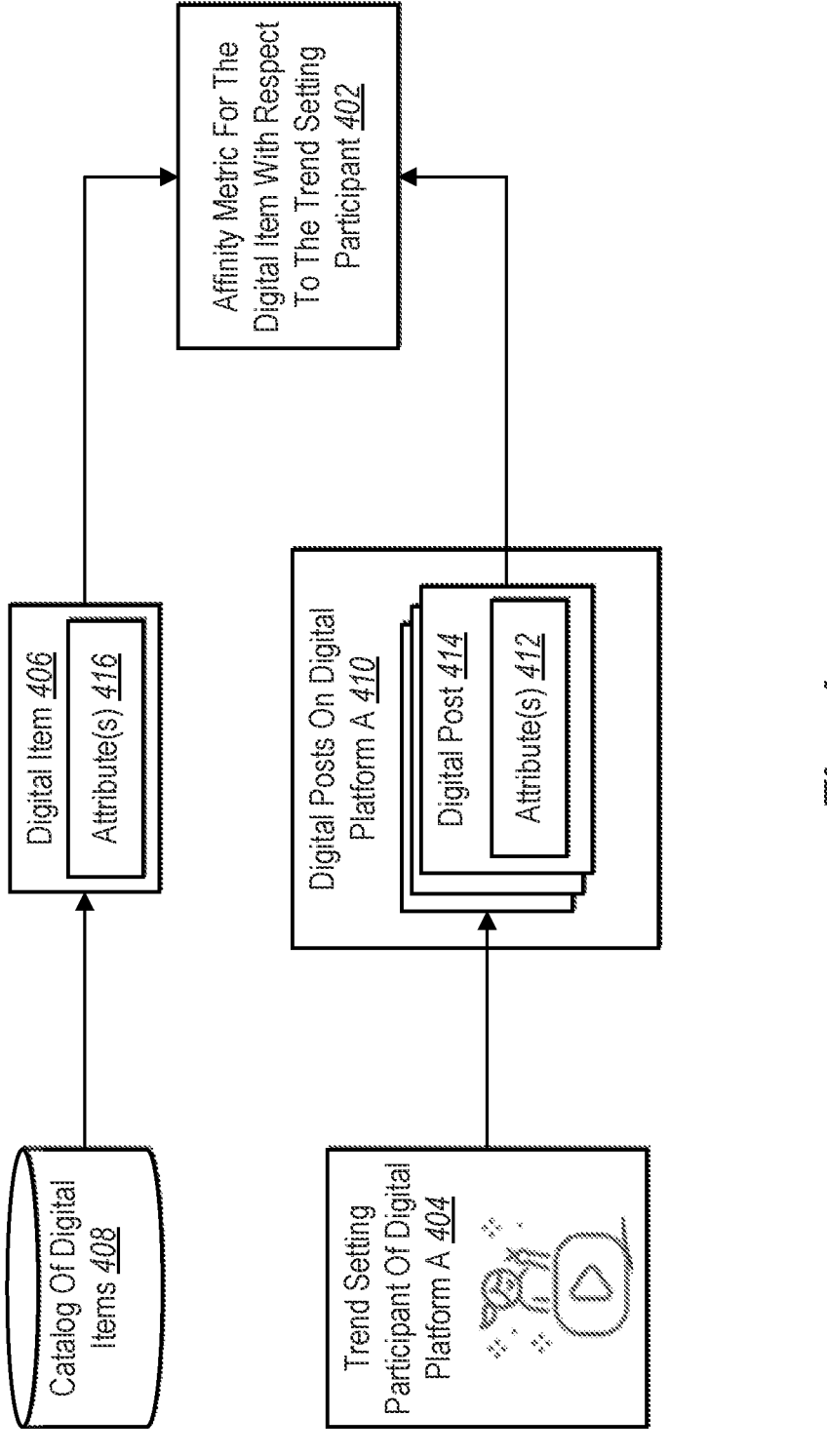
FIG. 4 illustrates a diagram for determining an affinity between a trend setting participant and a digital item in accordance with one or more embodiments.

As previously discussed, in one or more embodiments, the trend anticipated distribution system 106 determines affinities between trend setting participants of digital platforms and a catalog of digital items. In particular, in some embodiments, the trend anticipated distribution system 106 determines affinities for the digital items from the catalog with respect to the trend setting participants. FIG. 4 illustrates a diagram for determining an affinity between a trend setting participant and a digital item in accordance with one or more embodiments.

Indeed, as shown in FIG. 4, the trend anticipated distribution system 106 generates an affinity metric 402 that indicates an affinity between a trend setting participant 404 of a digital platform and a digital item 406 from a catalog of digital items 408. As shown, the trend anticipated distribution system 106 utilizes digital posts 410 of the trend setting participant 404 to generate the affinity metric 402. In particular, the trend anticipated distribution system 106 utilizes attributes of the digital posts 410—such as one or more attributes 412 of the digital post 414—to generate the affinity metric 402. Further, as shown, the trend anticipated distribution system 106 utilizes one or more attributes 416 of the digital item 406 in generating the affinity metric 402.

Indeed, in one or more embodiments, the trend anticipated distribution system 106 utilizes attributes of the digital posts 410 and corresponding attributes of the digital item 406 in generating the affinity metric 402. For instance, in some cases, the trend anticipated distribution system 106 utilizes one or more visual attributes associated with the digital posts 410 and one or more corresponding visual attributes of the digital item 406. For instance, in some cases, the trend anticipated distribution system 106 determines a measure of visual similarity between an item featured in one or more of the digital posts 410 and the digital item 406 based on their respective visual attributes. To illustrate, in some cases, the trend anticipated distribution system 106 determines the measure of visual similarity based on whether the item featured in one or more of the digital posts 410 and the digital item 406 have a similar form, structure, size, color scheme, visual pattern, logo, and/or other visual features.

As another example, in some cases, the trend anticipated distribution system 106 generates the affinity metric 402 using an association of an item featured in one or more of the digital posts 410 with the catalog of digital items 408. For example, in some cases, the trend anticipated distribution system 106 determines that the item featured in one or more of the digital posts 410 originates from the catalog of digital items 408. In some cases, the trend anticipated distribution system 106 determines that the item featured includes the digital item 406 or a related digital item from the catalog of digital items 408 (e.g., a digital item from the same category or a digital item that is used for a similar purpose).

As a further example, in one or more embodiments, the trend anticipated distribution system 106 generates the affinity metric 402 using one or more attributes indicated by metadata associated with one or more of the digital posts 410 and corresponding attributes of the digital item 406. For instance, in some cases, the trend anticipated distribution system 106 determines a color palette associated with the trend setting participant 404 based on one or more of the digital posts 410. To illustrate, in some instances, the trend anticipated distribution system 106 determines a color palette portrayed within one or more of the digital posts 410 (e.g., a color palette associated with a background of the digital posts, items featured in the digital posts, clothing worn by the trend setting participant 404 in the digital posts or a combination, thereof). Accordingly, in some embodiments, the trend anticipated distribution system 106 determines a correspondence between the determined color palette and a color palette of the digital item 406.

As another example, in some implementations, the trend anticipated distribution system 106 determines (e.g., via a natural language processing model) a natural language processing output of textual data associated with one or more of the digital posts 410. For instance, in some cases, the trend anticipated distribution system 106 determines a natural language processing output of one or more of a title of a digital post, a description of a digital post, captions associated with the digital post, labels associated with the digital post, or other textual metadata. The natural language processing output includes various types of relevant output, such as extracted keywords, summaries, classification, sentiment analysis, or entity detection. Accordingly, in some embodiments, the trend anticipated distribution system 106 further determines corresponding attributes of the digital item 406, such as whether the digital item 406 has a title or description mentioned in the textual data or is found at a location referenced by or linked to within one or more of the digital posts 410.

In one or more embodiments, the trend anticipated distribution system 106 generates the affinity metric 402 utilizing a combination of the attributes described above. For instance, in some cases, the trend anticipated distribution system 106 utilizes a weighted combination. Further, in some instances, the trend anticipated distribution system 106 utilizes one digital post or a combination of digital posts of the trend setting participant 404 to generate the affinity metric 402. In at least one implementation, for instance, the trend anticipated distribution system 106 utilizes a plurality of digital posts of the trend setting participant 404 but weighs the digital posts based on recency (e.g., so that more recent digital posts are given higher weight).

Though FIG. 4 illustrates utilizing digital posts provided on the digital platform for which the trend setting participant 404 is designated as a trend setter, the trend anticipated distribution system 106 utilizes digital posts or other activity by the trend setting participant 404 on other digital platforms in some implementations (including those on which trend setter designation is not applied). For instance, in some cases, the trend anticipated distribution system 106 monitors purchases of the trend setting participant 404 from the catalog of digital items 408 or comments of the trend setting participant on a marketplace that features the digital items. In some implementations, the trend anticipated distribution system 106 maintains a mapping of digital platform profiles associated with the trend setting participant 404 and uses the mapping to attribute digital posts on other digital platforms to the trend setting participant 404.

In one or more embodiments, the trend anticipated distribution system 106 similarly generates an affinity metric for one or more other digital items from the catalog of digital items 408 with respect to the trend setting participant 404. Indeed, in some embodiments, the trend anticipated distribution system 106 generates an affinity metric for each digital item from the catalog of digital items 408 with respect to the trend setting participant 404. In some implementations, the trend anticipated distribution system 106 further generates an affinity metric for the digital item 406 (and the other digital items) with respect to every other identified trend setting participant whether they are a trend setting participant of the same digital platform as the trend setting participant 404 or of another digital platform. Thus, in some cases, the trend anticipated distribution system 106 generates a plurality of affinity metrics for each digital item from the catalog of digital items 408, where the affinity metrics for the digital item indicate affinities between the digital item and a plurality of trend setting participants from a plurality of digital platforms.

Figure 5:
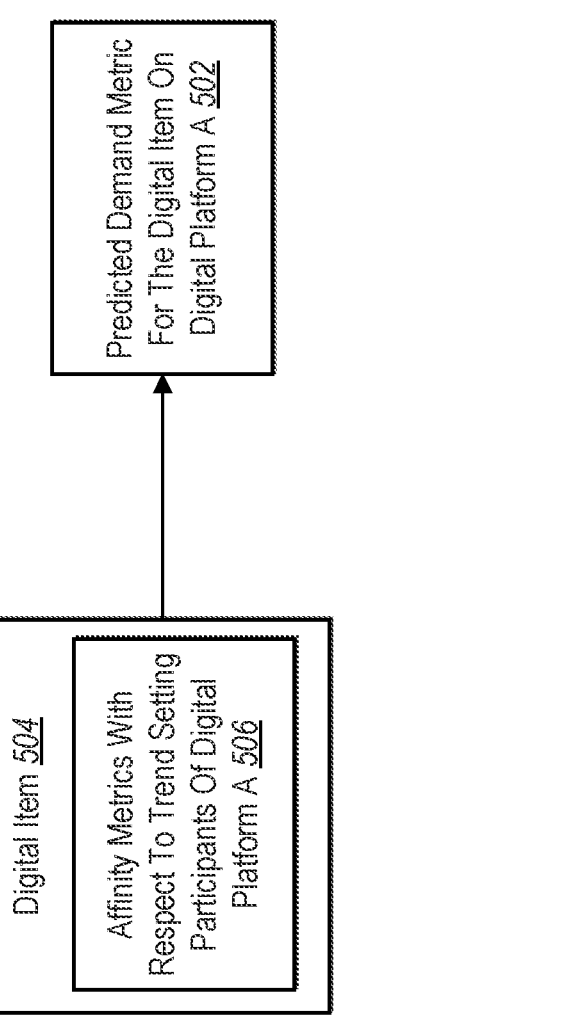
FIG. 5 illustrates a diagram for determining a predicted demand metric for a digital item in accordance with one or more embodiments.

As previously mentioned, in some embodiments, the trend anticipated distribution system 106 determines a predicted demand metric for a digital item on a digital platform. FIG. 5 illustrates a diagram for determining a predicted demand metric for a digital item in accordance with one or more embodiments.

As shown in FIG. 5, the trend anticipated distribution system 106 determines a predicted demand metric 502 for a digital item 504 on a digital platform using affinity metrics 506 determined for the digital item 504 with respect to trend setting participants of the digital platform. In other words, the trend anticipated distribution system 106 predicts a level of demand for the digital item 504 on a particular digital platform based on its affinity to the digital platform's trend setting participants. In one or more embodiments, the trend anticipated distribution system 106 determines the predicted demand metric 502 using a combination of the affinity metrics 506, such as a weighted combination.

Thus, as indicated above, in one or more embodiments, the predicted demand metric 502 provides an indication of whether the digital item 504 is anticipated to begin trending on the corresponding digital platform. For instance, in some embodiments, where the affinity metrics 506 indicate that the digital item 504 has a high affinity with one or more trend setting participants of the digital platform, the predicted demand metric 502 indicates that a trend for the digital item 504 is anticipated on the digital platform. On the other hand, in some implementations, where the affinity metrics 506 indicate that the digital item 504 has no affinity with any trend setting participant or very low affinity with the trend setting participants, the trend anticipated distribution system 106 determines that a trend for the digital item 504 is not anticipated on the digital platform. In one or more embodiments, the trend anticipated distribution system 106 establishes a predicted demand threshold and determines whether the predicted demand metric 502 indicates an anticipated trend by compared the predicted demand metric 502 to the predicted demand threshold.

As further indicated above, in one or more embodiments, the predicted demand metric 502 also provides an indication of a predicted level of an anticipated trend on the digital platform. As one example, where the affinity metrics 506 indicate a high affinity of the digital item 504 with every trend setting participant identified for the digital platform, the predicted demand metric 502 indicates that the anticipated trend for the digital item 504 will be very strong in some embodiments. On the other hand, in some cases, where the affinity metrics 506 indicate a relatively lower affinity of the digital item 504 with the trend setting participants, the predicted demand metric indicates that the anticipated trend for the digital item 504 will be relatively weaker. In some implementations the value of the predicted demand metric 502 indicates the level of the anticipated trend so that a relatively higher value indicates a relatively stronger trend.

In one or more embodiments, the trend anticipated distribution system 106 similarly determines a predicted demand metric for the digital item 504 on one or more additional digital platforms. Further, in some embodiments, the trend anticipated distribution system 106 determines predicted demand metrics for the other digital items from the catalog of digital items on the digital platform as well as the other digital platforms. Accordingly, in some implementations, the trend anticipated distribution system 106 determines a plurality of predicted demand metrics for a plurality of digital items on a plurality of digital platforms, where the plurality of predicted demand metrics includes a separate predicted demand metric for each digital item on each digital platform.

Figure 6:
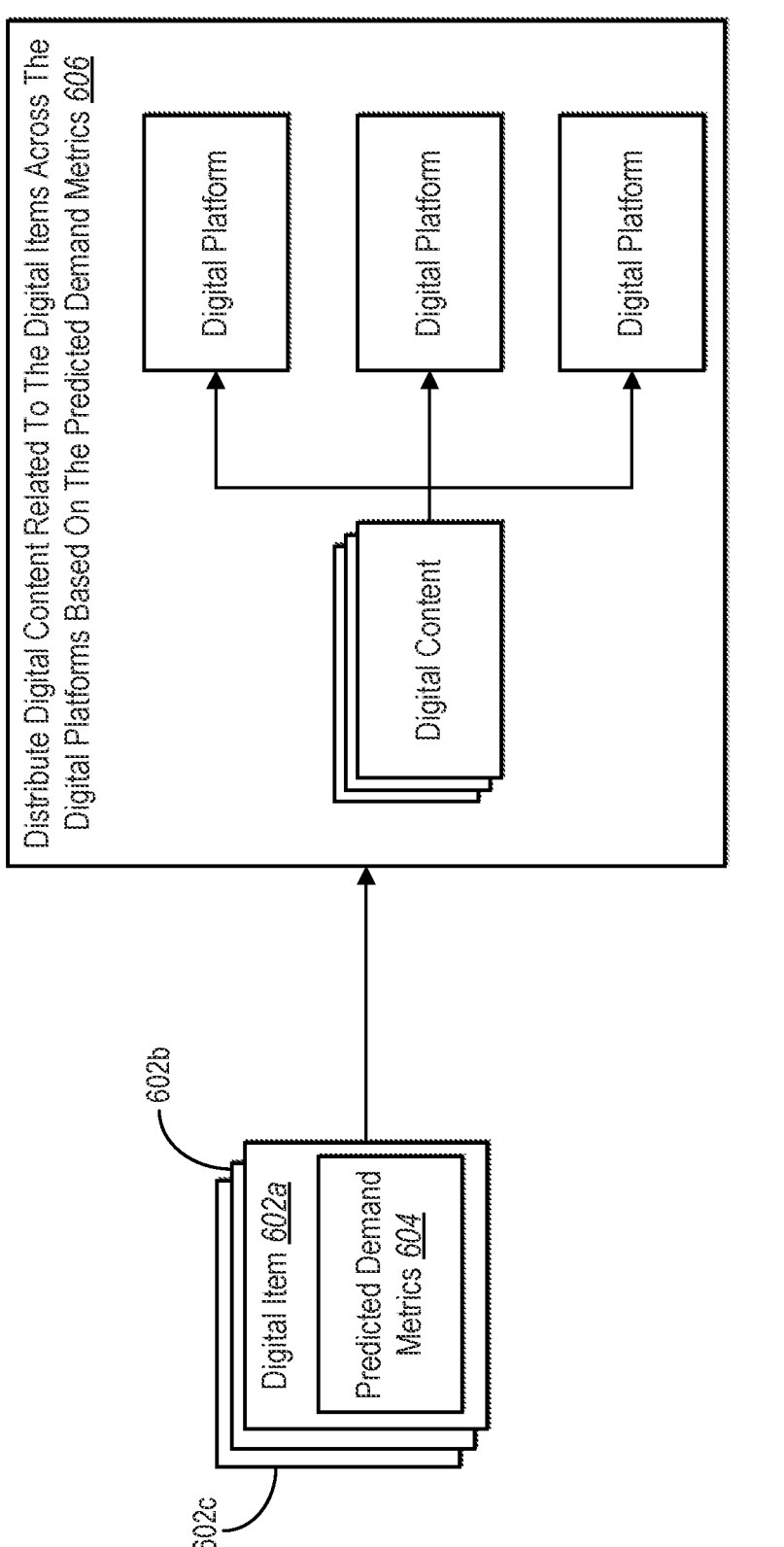
FIG. 6 illustrates a diagram for distributing digital content related to digital items across digital platforms using predicted demand metrics for the digital items in accordance with one or more embodiments.

FIG. 6 illustrates a diagram for distributing digital content related to digital items across digital platforms using predicted demand metrics for the digital items in accordance with one or more embodiments. Indeed, as shown in FIG. 6, the trend anticipated distribution system 106 determines predicted demand metrics for a plurality of digital items 602a-602c, such as the predicted demand metrics 604 for the digital item 602a. In one or more embodiments, the digital items 602a-602c correspond to the digital items from a catalog of digital items. Further, in some cases, the predicted demand metrics of a digital item indicates a predicted level of demand for that digital item on each digital platform from a plurality of digital platforms.

As further shown in FIG. 6, the trend anticipated distribution system 106 performs an act 606 of distributing digital content related to the digital items 602a-602c across the digital platforms based on the predicted demand metrics for the digital items 602a-602c. Thus, in one or more embodiments, the trend anticipated distribution system 106 distributes digital content related to the digital items 602a-602c based on which digital platforms the digital items 602a-602c are anticipated to trend.

To illustrate, in one or more embodiments, the predicted demand metrics 604 for the digital item 602a indicate a relatively higher demand for the digital item 602a on a first digital platform and a relatively lower demand for the digital item 602a on a second digital platform. Accordingly, in some cases, the trend anticipated distribution system 106 distributes all digital content related to the digital item 602a to the first digital platform and determines not to distribute any digital content related to the digital item 602a to the second digital platform. In some implementations, however, the trend anticipated distribution system 106 distributes a first set of digital content related to the digital item 602a to the first digital platform and distributes a second set of digital content having less digital content related to the digital item 602a to the second digital platform.

As another example, in one or more embodiments, the trend anticipated distribution system 106 determines that the predicted demand metrics 604 for the digital item 602a indicates a higher level of demand for the digital item 602a on a digital platform when compared to the digital item 602b and the digital item 602c. Accordingly, in some cases, the trend anticipated distribution system 106 distributes a larger set of digital content related to the digital item 602a to the digital platform when compared to the digital content for the digital items 602b-602c sent to the digital platform.

Accordingly, in one or more embodiments, the trend anticipated distribution system 106 distributes item-based digital content across digital platforms using the trend setting participants of those digital platforms. Indeed, the trend anticipated distribution system 106 anticipates a trend for a digital item on a digital platform based on an affinity between the digital item and the trend setting participants of the digital platform. To meet the predicted demands associated with the anticipated trend, the trend anticipated distribution system 106 distributes digital content related to that digital item for display to via that digital platform. Thus, as client devices access the digital platform, the trend anticipated distribution system 106 facilitates the exposure of that digital item, promoting its use by those client devices. Indeed, in one or more embodiments, the algorithms and acts described with reference to FIGS. 3-6 comprise the corresponding structure for performing a step for distributing digital content related to digital items for display on client devices via a plurality of digital platforms using a set of trend setting participants.

It should be understood, however, that the trend anticipated distribution system 106 accommodates various distribution goals in various embodiments. Indeed, in some cases, the trend anticipated distribution system 106 modifies the distribution method to realize identified distribution goals. Thus, the trend anticipated distribution system 106 implements various approaches to distributing digital content using the predicted demand metrics of the digital items 602a-602c across the digital platforms.

Figure 7:
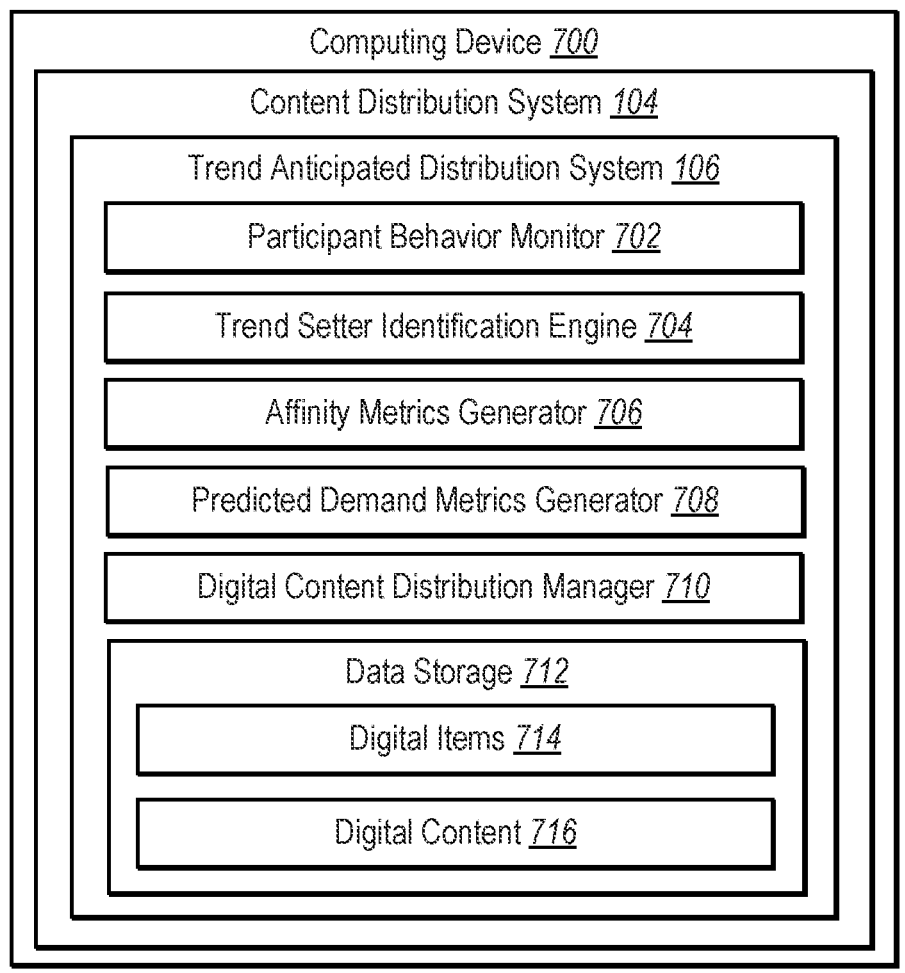
FIG. 7 illustrates an example schematic diagram of a feature recommendation system in accordance with one or more embodiments.

Turning to FIG. 7, additional detail will now be provided regarding various components and capabilities of the trend anticipated distribution system 106. In particular, FIG. 7 shows the trend anticipated distribution system 106 implemented by the computing device 700 (e.g., the server(s) 102, one of the client devices 110a-110n, and/or the third-party server(s) 114 discussed above with reference to FIG. 1). Additionally, the trend anticipated distribution system 106 is also part of the content distribution system 104. As shown, in one or more embodiments, the trend anticipated distribution system 106 includes, but is not limited to, a participant behavior monitor 702, a trend setter identification engine 704, an affinity metrics generator 706, a predicted demand metrics generator 708, a digital content distribution manager 710, and data storage 712 (which includes digital items 714 and digital content 716).

As just mentioned, and as illustrated in FIG. 7, the trend anticipated distribution system 106 includes the participant behavior monitor 702. In one or more embodiments, the participant behavior monitor 702 receives, determines, or generates behavioral metrics related to participants of a plurality of digital platforms. For instance, in some cases, the participant behavior monitor 702 monitors the activity of the participants on the digital platforms and determines the behavioral metrics based on the monitored activity.

Additionally, as shown in FIG. 7, the trend anticipated distribution system 106 includes the trend setter identification engine 704. In one or more embodiments, the trend setter identification engine 704 determines which participants of a digital platform are trend setting participants. To illustrate, in some embodiments, the trend setter identification engine 704 determines trend setting scores for the participants of the digital platform and identifies trend setting participants based on the trend setting scores. In some cases, the trend setter identification engine 704 determines a separate trend setting score for a participant with respect to each digital platform from a plurality of digital platforms.

As shown in FIG. 7, the trend anticipated distribution system 106 further includes the affinity metrics generator 706. In one or more embodiments, the affinity metrics generator 706 generates affinity metrics for digital items with respect to trend setting participants. For instance, in some cases, the affinity metrics generator 706 generates a separate affinity metric for a digital item with respect to each identified trend setting participant. In some implementations, the affinity metrics generator 706 generates an affinity metric based on one or more attributes of digital posts of the trend setting participant and one or more corresponding attributes of the digital item.

As shown in FIG. 7, the trend anticipated distribution system 106 also includes the predicted demand metrics generator 708. In one or more embodiments, the predicted demand metrics generator 708 generates predicted demand metrics for digital items. For instance, in some cases, the predicted demand metrics generator 708 generates a predicted demand metric for a digital item on a digital platform. Indeed, in some cases, the predicted demand metrics generator 708 generates a separate predicted demand metric for a digital item with respect to each digital platform under consideration.

Further, as shown in FIG. 7, the trend anticipated distribution system 106 includes the digital content distribution manager 710. In one or more embodiments, the digital content distribution manager 710 distributes digital content related to digital items for display across various digital platforms. In particular, the digital content distribution manager 710 distributes the digital content using the predicted demand metrics of the corresponding digital items. Thus, in some cases, the digital content distribution manager 710 distributes the digital content to meet predicted demand for a digital item on a digital platform that corresponds to an anticipated trend for the digital item on the digital platform.

Additionally, as shown in FIG. 7, the trend anticipated distribution system 106 includes data storage 712. In particular, data storage 712 includes the digital items 714 (e.g., the digital items from a catalog of digital items) and the digital content 716 that relates to the digital items 714.

Each of the components 702-716 of the trend anticipated distribution system 106 optionally include software, hardware, or both. For example, the components 702-716 include one or more instructions stored on a computer-readable storage medium and executable by processors of one or more computing devices, such as a client device or server device. When executed by the one or more processors, the computer-executable instructions of the trend anticipated distribution system 106 cause the computing device(s) to perform the methods described herein. Alternatively, the components 702-716 include hardware, such as a special-purpose processing device to perform a certain function or group of functions. Alternatively, the components 702-716 of the trend anticipated distribution system 106 include a combination of computer-executable instructions and hardware.

Furthermore, the components 702-716 of the trend anticipated distribution system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-716 of the trend anticipated distribution system 106 may be implemented as a stand-alone application, such as a desktop or mobile application. Furthermore, the components 702-716 of the trend anticipated distribution system 106 may be implemented as one or more web-based applications hosted on a remote server. Alternatively, or additionally, the components 702-716 of the trend anticipated distribution system 106 may be implemented in a suite of mobile device applications or "apps." For example, in one or more embodiments, the trend anticipated distribution system 106 comprises or operates in connection with digital software applications such as ADOBE® TARGET, ADOBE® MAGENTO or ADOBE® MARKETING CLOUD. The foregoing are either registered trademarks or trademarks of Adobe Inc. in the United States and/or other countries.

Figure 8:
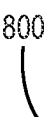
FIG. 8 illustrates a flowchart for a series of acts for distributing digital content for digital items across digital platforms using a predicted demand for the digital items in accordance with one or more embodiments.
Figure 8:
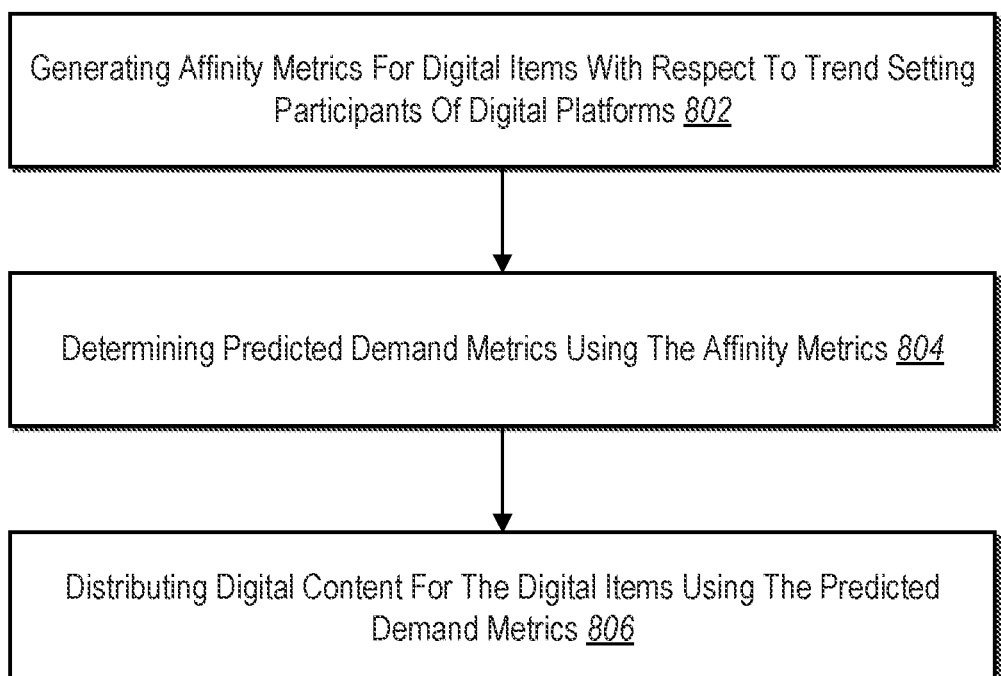

FIGS. 1-7, the corresponding text, and the examples provide a number of different methods, systems, devices, and non-transitory computer-readable media of the trend anticipated distribution system 106. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart for a series of acts 800 for distributing digital content for digital items across digital platforms using a predicted demand for the digital items in accordance with one or more embodiments. FIG. 8 illustrates acts according to one embodiment, alternative embodiments may omit, add to, reorder, and/or modify any of the acts shown in FIG. 8. In some implementations, the acts of FIG. 8 are performed as part of a method. For example, in some embodiments, the acts of FIG. 8 are performed as part of a computer-implemented method.

Alternatively, a non-transitory computer-readable medium can store instructions thereon that, when executed by at least one processor, cause the at least one processor to perform operations comprising the acts of FIG. 8. In some embodiments, a system performs the acts of FIG. 8. For example, in one or more embodiments, a system includes at least one memory device comprising digital content related to digital items from a catalog of digital items. The system further includes at least one processor configured to cause the system to perform the acts of FIG. 8.

The series of acts 800 includes an act 802 for generating affinity metrics for digital items with respect to trend setting participants of digital platforms. For instance, in one or more embodiments, the act 802 involves generating affinity metrics for digital items from a catalog of digital items with respect to a plurality of trend setting participants of a plurality of digital platforms using attributes of digital posts by the plurality of trend setting participants on the plurality of digital platforms and corresponding attributes of the digital items.

In one or more embodiments, the trend anticipated distribution system 106 determines or identifies the plurality of trend setting participants. For instance, in some embodiments, the trend anticipated distribution system 106 determines trend setting scores for participants of the plurality of digital platforms by determining trend setting scores for a participant using activities of the participant on the plurality of digital platforms and activities of one or more additional participants on the plurality of digital platforms; and determines the plurality of trend setting participants from the participants using the trend setting scores.

In one or more embodiments, the trend anticipated distribution system 106 determines an attribute of a digital post by a trend setting participant and a corresponding attribute of a digital item from the catalog of digital items by determining a visual attribute of an item featured in the digital post and a visual attribute of the digital item; and determines a measure of visual similarity between the item featured in the digital post and the digital item using the visual attribute of the item and the visual attribute of the digital item. Accordingly, in some embodiments, generating the affinity metrics for the digital items with respect to the plurality of trend setting participants using the attributes of the digital posts and the corresponding attributes of the digital items comprises generating an affinity metric for the digital item with respect to the trend setting participant using the measure of visual similarity between the item featured in the digital post and the digital item.

In some cases, the trend anticipated distribution system 106 determines an attribute of a digital post by a trend setting participant and a corresponding attribute of a digital item by: determining that the digital item is from the catalog of digital items; and determining that an item featured in the digital post comprises the digital item from the catalog of digital items or a related digital item from the catalog of digital items. In some embodiments, the trend anticipated distribution system 106 determines an attribute of a digital post by a trend setting participant and a corresponding attribute of a digital item by: determining a color palette portrayed by the digital post by the trend setting participant; and determining a color palette of the digital item.

The series of acts 800 also includes an act 804 for determining predicted demand metrics using the affinity metrics. For example, in one or more embodiments, the act 804 involves determining predicted demand metrics for the digital items on the plurality of digital platforms using the affinity metrics. In one or more embodiments, determining the predicted demand metrics for the digital items on the plurality of digital platforms using the affinity metrics comprises determining a predicted demand metric for a digital item on a digital platform using one or more affinity metrics generated for the digital item with respect to one or more trend setting participants of the digital platform.

Further, the series of acts 800 includes an act 806 for distributing digital content for the digital items using the predicted demand metrics. To illustrate, in some cases, the act 806 involves distributing digital content related to the digital items for display on a plurality of client devices via the plurality of digital platforms using the predicted demand metrics.

In one or more embodiments, distributing the digital content related to the digital items for display on the plurality of client devices via the plurality of digital platforms using the predicted demand metrics comprises: determining that a first predicted demand metric for a digital item on a first digital platform indicates a higher predicted demand than a second predicted demand metric for the digital item on a second digital platform; and distributing a first set of digital content related to the digital item for display via the first digital platform based on determining that the first predicted demand metric indicates the higher predicted demand. Further, in some implementations, distributing the digital content related to the digital items for display on the plurality of client devices via the plurality of digital platforms using the predicted demand metrics comprises distributing a second set of digital content related to the digital item for display via the second digital platform, the second set of digital content containing less digital content than the first set of digital content distributed to the first digital platform.

To provide an illustration, in one or more embodiments, the trend anticipated distribution system 106 determines a set of trend setting participants of a plurality of digital platforms; determines, for each trend setting participant from the set of trend setting participants, attributes of digital posts by the trend setting participant on one or more digital platforms from the plurality of digital platforms; generates, for the digital items from the catalog of digital items, affinity metrics with respect to each trend setting participant from the set of trend setting participants of the plurality of digital platforms using the attributes of the digital posts by the trend setting participant; and distributes the digital content related to the digital items for display across the plurality of digital platforms using the affinity metrics generated with respect to each trend setting participant.

In some cases, the trend anticipated distribution system 106 determines the attributes of the digital posts by the trend setting participant by determining one or more attributes indicated by metadata associated with the digital posts by the trend setting participant. Further, in some embodiments, determining the one or more attributes indicated by the metadata associated with the digital posts by the trend setting participant comprises determining the one or more attributes indicated by a natural language processing output of textual data associated with the digital posts by the trend setting participant.

In some implementations, the trend anticipated distribution system 106 determines, for each digital item from the catalog of digital items, a predicted demand metric for the digital item on each digital platform from the plurality of digital platforms using one or more affinity metrics generated with respect to one or more trend setting participants of the digital platform. Accordingly, in some instances, the trend anticipated distribution system 106 distributes the digital content related to the digital items for display across the plurality of digital platforms using the affinity metrics generated with respect to each trend setting participant by distributing the digital content using the predicted demand metric for each digital item on each digital platform. To illustrate, in at least one implementation, distributing the digital content using the predicted demand for each digital item on each digital platform comprises: determining that a first predicted demand metric of a first digital item from the catalog of digital items indicates a higher predicted demand of the first digital item on a first digital platform than other digital items from the catalog of digital items; and distributing a set of digital content related to the first digital item for display via the first digital platform based on determining that the first predicted demand metric indicates the higher predicted demand of the first digital item on the first digital platform.

In one or more embodiments, the trend anticipated distribution system 106 determines the set of trend setting participants of the plurality of digital platforms by determining to include a participant within the set of trend setting participants by determining that the participant is a trend setting participant of at least one digital platform from the plurality of digital platforms. Further, in some cases, the trend anticipated distribution system 106 determines the attributes of the digital posts by the trend setting participant on the one or more digital platforms by determining a measure of visual similarity of an item featured in a digital post by the trend setting participant to a digital item from catalog of digital items.

To provide another illustration, in one or more embodiments, the trend anticipated distribution system 106 receives behavioral metrics related to participants of a plurality of digital platforms; and determines trend setting scores for the participants using the behavioral metrics to identify a set of trend setting participants of the plurality of digital platforms. Accordingly, the trend anticipated distribution system 106 distributes digital content for display across the plurality of digital platforms using the set of trend setting participants.

In some cases, receiving the behavioral metrics related to the participants of the plurality of digital platforms comprises receiving, for each participant, one or more behavioral metrics that indicate an activity level of the participant on one or more social media platforms. Further, in some instances, determining the trend setting scores for the participants using the behavioral metrics comprises determining, for a participant, a trend setting score with respect to a digital platform based on one or more digital items featured by the participant on the digital platform that are subsequently featured by a plurality of additional participants on the digital platform after a lagging period.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
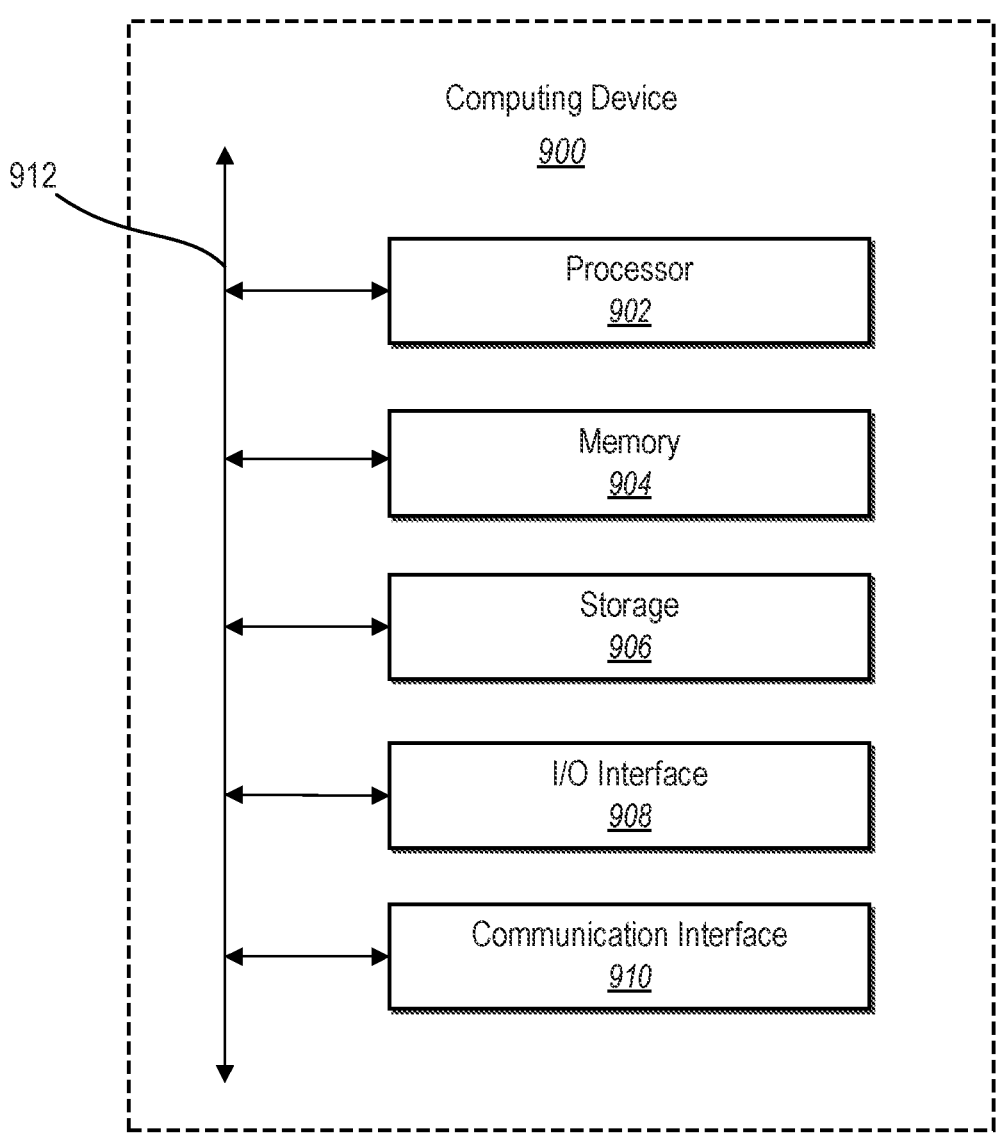
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102, the client devices 110a-110n, and/or the third-party server(s) 114). In one or more embodiments, the computing device 900 may be a mobile device (e.g., a mobile telephone, a smartphone, a PDA, a tablet, a laptop, a camera, a tracker, a watch, a wearable device). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device

900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   at least one memory device; and
   at least one processor configured to cause the system to:
      determine a set of trend setting participants of a plurality of digital platforms;
      determine, for each trend setting participant from the set of trend setting participants, attributes of digital posts by the trend setting participant on one or more digital platforms from the plurality of digital platforms by, for at least one digital post of the digital posts by the trend setting participant:
         determining textual data of the at least one digital post; and
         determining at least one attribute for the at least one digital post by generating, using a natural language processing model, a natural language processing output from the textual data;
      generate, for digital items from a catalog of digital items, affinity metrics with respect to each trend setting participant from the set of trend setting participants of the plurality of digital platforms using the attributes of the digital posts by the trend setting participant;
      determine, for each digital item from the catalog of digital items, a predicted demand metric for the digital item on each digital platform from the plurality of digital platforms using one or more affinity metrics generated with respect to one or more trend setting participants of the digital platform; and
      distribute digital content related to the digital items for display across the plurality of digital platforms using the predicted demand metric for each digital item on each digital platform.

2. The system of claim 1, wherein the at least one processor is configured to cause the system to determine the attributes of the digital posts by the trend setting participant by determining one or more attributes indicated by metadata associated with the digital posts by the trend setting participant.

3. The system of claim 2, wherein;
   determining the textual data of the at least one digital post comprises determining at least one of a title, a description, a caption, a label, or textual metadata; and
   generating, using the natural language processing model, the natural language processing output comprises generating, using the natural language processing model, the natural language processing output having at least one of an extracted keyword, a summary, a classification, a sentiment analysis, or a detected entity.

4. The system of claim 1, wherein the at least one processor is further configured to cause the system to determine the set of trend setting participants of the plurality of digital platforms by:

determining behavioral metrics related to participants of the plurality of digital platforms; and determining trend setting scores for the participants using the behavioral metrics to identify the set of trend setting participants of the plurality of digital platforms.

5. The system of claim 4, wherein determining the behavioral metrics related to the participants of the plurality of digital platforms comprises determining, for each participant, one or more behavioral metrics that indicate an activity level of the participant on one or more social media platforms.

6. The system of claim 1, wherein distributing the digital content using the predicted demand metric for each digital item on each digital platform comprises:

determining that a first predicted demand metric of a first digital item from the catalog of digital items indicates a higher predicted demand of the first digital item on a first digital platform than other digital items from the catalog of digital items; and distributing a set of digital content related to the first digital item for display via the first digital platform based on determining that the first predicted demand metric indicates the higher predicted demand of the first digital item on the first digital platform.

7. The system of claim 1, wherein the at least one processor is configured to cause the system to determine the set of trend setting participants of the plurality of digital platforms by determining to include a participant within the set of trend setting participants by determining that the participant is a trend setting participant of at least one digital platform from the plurality of digital platforms.

8. The system of claim 1, wherein the at least one processor is configured to cause the system to determine the attributes of the digital posts by the trend setting participant on the one or more digital platforms by determining a measure of visual similarity of an item featured in a digital post by the trend setting participant to a digital item from catalog of digital items.

9. A non-transitory computer-readable medium storing instructions that, when executed by at least one processor, cause the at least one processor to perform operations comprising:

determining a set of trend setting participants of a plurality of digital platforms;

determining, for each trend setting participant from the set of trend setting participants, attributes of digital posts by the trend setting participant on one or more digital platforms from the plurality of digital platforms by, for at least one digital post of the digital posts by the trend setting participant:

determining textual data of the at least one digital post; and determining at least one attribute for the at least one digital post by generating, using a natural language processing model, a natural language processing output from the textual data;

generating, for digital items from a catalog of digital items, affinity metrics with respect to each trend setting participant from the set of trend setting participants of the plurality of digital platforms using the attributes of the digital posts by the trend setting participant;

determining, for each digital item from the catalog of digital items, a predicted demand metric for the digital item on each digital platform from the plurality of digital platforms using one or more affinity metrics generated with respect to one or more trend setting participants of the digital platform; and distributing digital content related to the digital items for display across the plurality of digital platforms using the predicted demand metric for each digital item on each digital platform.

10. The non-transitory computer-readable medium of claim 9, wherein determining the attributes of the digital posts by the trend setting participant comprises determining one or more attributes indicated by metadata associated with the digital posts by the trend setting participant.

11. The non-transitory computer-readable medium of claim 10, wherein:

determining the textual data of the at least one digital post comprises determining at least one of a title, a description, a caption, a label, or textual metadata; and generating, using the natural language processing model, the natural language processing output comprises generating, using the natural language processing model, the natural language processing output having at least one of an extracted keyword, a summary, a classification, a sentiment analysis, or a detected entity.

12. The non-transitory computer-readable medium of claim 9, wherein determining the set of trend setting participants of the plurality of digital platforms comprises:

determining behavioral metrics related to participants of the plurality of digital platforms; and determining trend setting scores for the participants using the behavioral metrics to identify the set of trend setting participants of the plurality of digital platforms.

13. The non-transitory computer-readable medium of claim 12, wherein determining the behavioral metrics related to the participants of the plurality of digital platforms comprises determining, for each participant, one or more behavioral metrics that indicate an activity level of the participant on one or more social media platforms.

14. The non-transitory computer-readable medium of claim 13, wherein distributing the digital content using the predicted demand metric for each digital item on each digital platform comprises:

determining that a first predicted demand metric of a first digital item from the catalog of digital items indicates a higher predicted demand of the first digital item on a first digital platform than other digital items from the catalog of digital items; and distributing a set of digital content related to the first digital item for display via the first digital platform based on determining that the first predicted demand metric indicates the higher predicted demand of the first digital item on the first digital platform.

15. The non-transitory computer-readable medium of claim 9, wherein determining the set of trend setting participants of the plurality of digital platforms comprises determining to include a participant within the set of trend setting participants by determining that the participant is a trend setting participant of at least one digital platform from the plurality of digital platforms.

16. A method comprising:

determining a set of trend setting participants of a plurality of digital platforms;

determining, for each trend setting participant from the set of trend setting participants, attributes of digital posts by the trend setting participant on one or more digital platforms from the plurality of digital platforms by, for at least one digital post of the digital posts by the trend setting participant:

determining textual data of the at least one digital post; and determining at least one attribute for the at least one digital post by generating, using a natural language processing model, a natural language processing output from the textual data;

generating, for digital items from a catalog of digital items, affinity metrics with respect to each trend setting participant from the set of trend setting participants of the plurality of digital platforms using the attributes of the digital posts by the trend setting participant;

determining, for each digital item from the catalog of digital items, a predicted demand metric for the digital item on each digital platform from the plurality of digital platforms using one or more affinity metrics generated with respect to one or more trend setting participants of the digital platform; and distributing digital content related to the digital items for display across the plurality of digital platforms using the predicted demand metric for each digital item on each digital platform.

17. The method of claim 16, wherein determining the attributes of the digital posts by the trend setting participant on the one or more digital platforms comprises determining a measure of visual similarity of an item featured in a digital post by the trend setting participant to a digital item from catalog of digital items.

18. The method of claim 16, wherein determining the attributes of the digital posts by the trend setting participant comprises determining one or more attributes indicated by metadata associated with the digital posts by the trend setting participant.

19. The method of claim 16, wherein determining the set of trend setting participants of the plurality of digital platforms comprises:

determining behavioral metrics related to participants of the plurality of digital platforms; and determining trend setting scores for the participants using the behavioral metrics to identify the set of trend setting participants of the plurality of digital platforms.

20. The method of claim 16, wherein determining the set of trend setting participants of the plurality of digital platforms by determining to include a participant within the set of trend setting participants by determining that the participant is a trend setting participant of at least one digital platform from the plurality of digital platforms.

* * * * *